United States Patent [19]

White et al.

[11] Patent Number: 5,187,611
[45] Date of Patent: Feb. 16, 1993

[54] DIFFUSE ON-AXIS LIGHT SOURCE

[75] Inventors: Timothy P. White, New Boston, N.H.; Steve M. LeBlanc, Andover, Mass.

[73] Assignee: Northeast Robotics, Inc., New Boston, N.H.

[21] Appl. No.: 750,257

[22] Filed: Aug. 27, 1991

[51] Int. Cl.⁵ .................. G02B 5/02; G02B 27/14
[52] U.S. Cl. .................... 359/599; 359/389; 359/614; 359/613; 358/101; 358/225
[58] Field of Search ............. 359/599, 389, 614, 613, 359/629; 358/225, 95, 101, 106, 107

[56] References Cited

U.S. PATENT DOCUMENTS

| 2,792,740 | 5/1957 | Haynes | 359/637 |
| 2,926,559 | 3/1960 | Oppenheimer | 359/629 |
| 3,944,336 | 3/1976 | Carr | 359/629 |
| 3,984,157 | 10/1976 | Le Vantine | 359/614 |
| 3,985,425 | 10/1976 | Clapp | 350/147 |
| 4,185,902 | 1/1980 | Plaot | 359/614 |
| 4,561,722 | 12/1985 | Smetana | 356/438 |
| 4,712,889 | 12/1987 | Schindl | 359/389 |
| 4,791,534 | 12/1988 | Lindberg | 359/629 |
| 4,854,688 | 8/1989 | Hayford et al. | 359/433 |
| 4,877,326 | 10/1989 | Chadwick et al. | 356/386 |
| 4,991,947 | 2/1991 | Sander et al. | 359/389 |
| 5,011,265 | 4/1991 | Tamamura et al. | 350/173 |

Primary Examiner—Jon W. Henry
Attorney, Agent, or Firm—Beaman & Beaman

[57] ABSTRACT

A light source suitable for illuminating work pieces imaged by machine vision cameras. A beam splitter mirror is located within the camera optical axis, a uniform intensity light source provides light to a diffuser and the diffused light is reflected from the beam splitter to uniformly illuminate the object being observed by the camera with a minimum of stray reflections or glare. Stray and incidental light is absorbed by a light trap located in opposed relation to the diffuser.

3 Claims, 2 Drawing Sheets

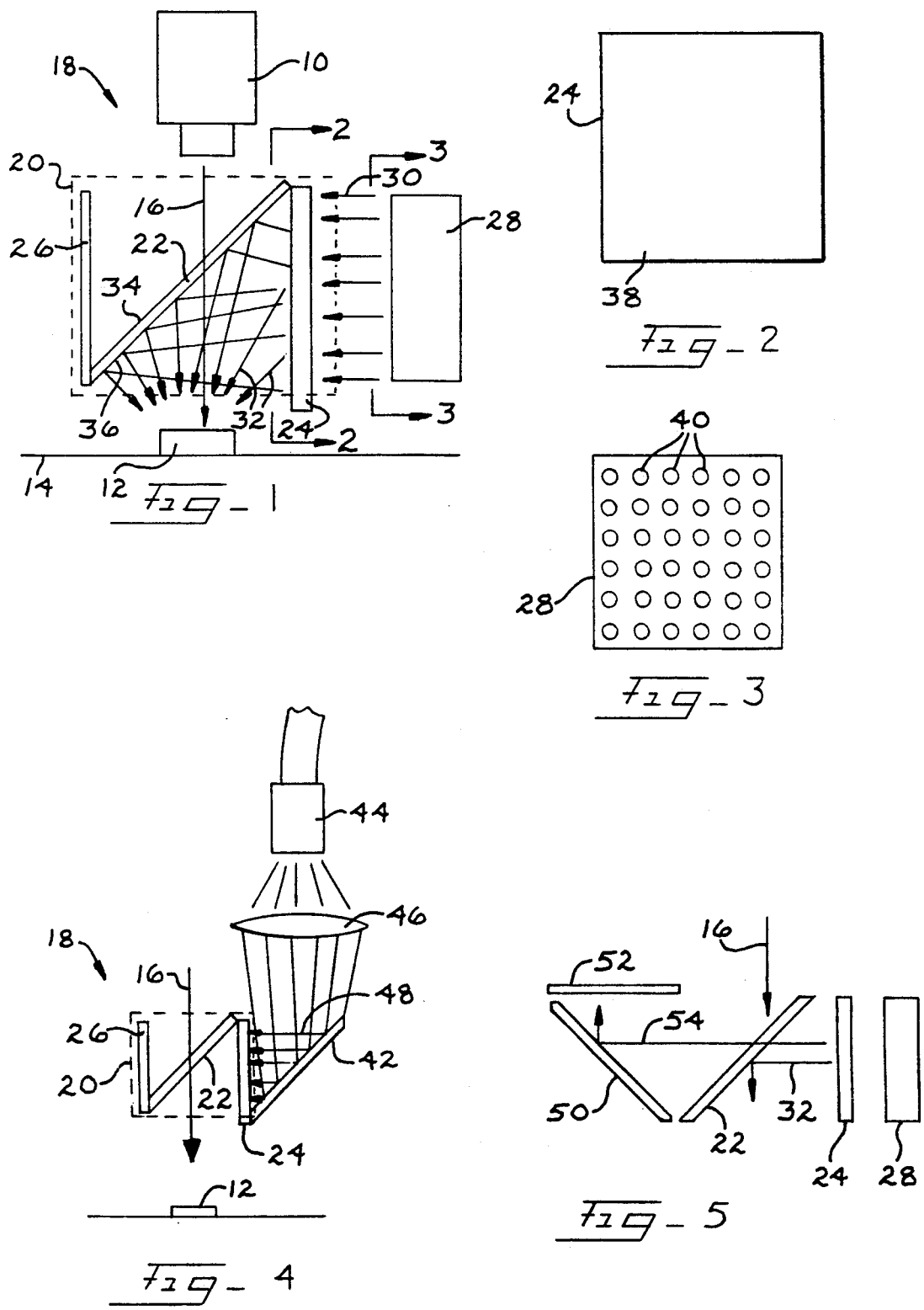

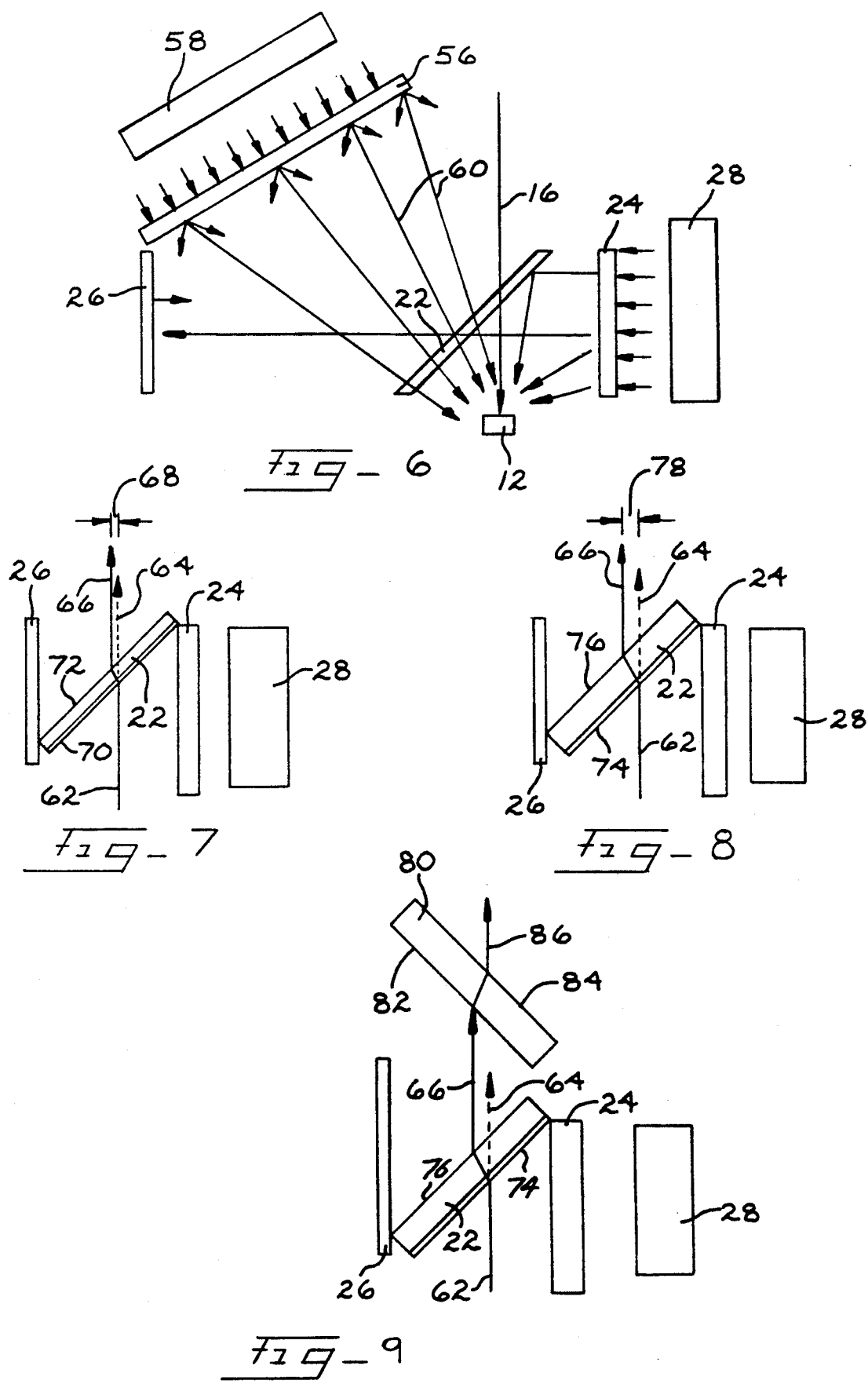

DIFFUSE ON-AXIS LIGHT SOURCE

BACKGROUND OF THE INVENTION

The invention pertains to an on-axis light source for illuminating objects imaged by a machine vision camera. Robotic assembly machines may utilize video cameras to observe the parts or work pieces being handled and assembled and the invention pertains to the illumination of such objects.

For instance, in the assembly of electronic components the chips and wafers are often assembled to a printed circuit board by robots. The electronic components may include highly reflective surfaces which must be imaged by the machine vision camera, and the uneven reflection of light from the work piece will produce an erroneous image and signal within the camera possibly resulting in a malfunction or mismeasurement. Previously available illumination for robotic handled parts, particularly small parts, has not produced a light which is uniform over the entire part being imaged, and which is free of shadows and glare. Electronic components often utilize etched characters appearing on a mirror like surface and proper illumination of such components is critical if high quality printed circuit board assembly is to be achieved.

In the microelectronics industry, solder pads on surface-mount devices are often imaged for assembly and manufacturing purposes and the accuracy of the machine vision is critical for correct alignment of the many components which may be mounted on a printed circuit board. For optimum alignment, solder pads must be clearly imaged in high contrast with their background, and a need for improved illumination of objects being imaged by machine vision cameras has long been recognized.

OBJECTS OF THE INVENTION

It is an object of the invention to provide an on-axis light source for machine vision cameras wherein a uniform diffused light illuminates an object being imaged by a machine vision camera, without the image of the camera itself appearing in the pattern of light reflected from the object.

Another object of the invention is to provide a machine vision on-axis light source which uses a diffused light in conjunction with a beam splitter wherein light may be evenly applied from many directions upon the object being imaged.

Another object of the invention is to provide an on-axis light source utilizing a uniform diffused light in conjunction with a beam splitter and a light trap wherein stray light is absorbed and prevented from entering the camera to eliminate false readings and images.

An additional object of the invention is to provide a machine vision on-axis light source utilizing a glass mirror type beam splitter, and wherein lateral offsetting of the optical axis is compensated for by the use of a correcting glass window.

A further object of the invention is to provide an on-axis light source for machine vision cameras wherein a uniform diffused light may be used in conjunction with a beam splitter wherein a plurality of diffused light sources may be imposed on the object being illuminated and imaged.

Yet an additional object of the invention is to provide a machine vision on-axis light source utilizing a mirror type beam splitter having a partially light reflective silvered surface on one side and an anti-reflection coated surface on the other side, the anti-reflection coating preventing double or ghost images from appearing in the camera image.

SUMMARY OF THE INVENTION

In the practice of the invention a machine vision camera, such as a video camera, includes an optical axis which extends to the object being imaged. In order to permit a clear image to be produced in the camera, it is important that the imaged object be properly illuminated, particularly if the object includes small characters or indicia which must be recorded and produce signals for manipulation purposes with robotic handling equipment.

In the invention a beam splitter preferably in the form of a mirror, but could comprise a cube or membrane, is located within the camera optical axis. The beam splitter includes a partially reflective surface obliquely related to the optical axis, usually at 45°, and is capable of reflecting a portion of the light cast upon the beam splitter, but permitting a percentage of the light to pass therethrough permitting camera imaging.

The reflective surface of the beam splitter is utilized to reflect diffused light onto the imaged object. In this regard a light diffuser in the form of a plate is located adjacent the beam splitter and a uniform light from a light source is cast upon the diffuser. The diffused light is received by the beam splitter and reflected upon the imaged object.

A light trap, in the form of a light absorbing panel, is located on the opposite side of the beam splitter with respect to the diffuser, and in opposed relationship to the diffuser. Thus, light from the diffuser passing through the beam splitter is absorbed by the light trap which prevents such light from being reflected into the camera as to produce undesirable signals.

As the light from the diffuser is reflected from the beam splitter, the imaged object will be illuminated in an on-axis manner resulting in a uniform illumination of the imaged object which produces a superior camera image and the appearance of uniform surface texture of the object despite angular non-uniformities of the object's surface or angle of presentation.

In the practice of the invention, it is also appreciated that a variety of light traps may be used wherein the likelihood of stray light passing through the beam splitter being received by the machine vision camera is substantially eliminated.

It is also envisioned that a plurality of light diffusers may be utilized in the practice of the invention wherein diffused light may be cast upon the imaged object both by reflection from the beam splitter and also by passing through the beam splitter. A further innovation includes the use of a correcting window between the machine vision camera and the mirror beam splitter to correct lateral displacement of the optical axis due to the displacement of the optical axis by the thickness of the glass beam splitter mirror obliquely related to the optical axis. The correcting window is preferably of the same glass type and thickness as the beam splitter and is angularly related to the optical axis in a manner equal to, but the reverse of, the beam splitter. The correcting window may be made of different transparent material than the beam splitter mirror if it has a different refractive index than the beam splitter mirror, and in such case the thickness of the correcting window may be adjusted in accord with its refractive index to produce the proper lateral alignment of the optical axis. It is also possible to use a beam splitter and correcting window having arcuate or curved surfaces, and in such case the beam splitter and correcting window will be so related that optical aberrations introduced by the beam splitter will be eliminated by the correcting window.

BRIEF DESCRIPTION OF THE DRAWINGS

The aforementioned objects and advantages of the invention will be appreciated from the following description and accompanying drawings wherein:

FIG. 1 is a schematic illustration of an on-axis light source in accord with the invention, FIG. 2 is an elevational view of the diffuser plate as taken along Section 2—2 of FIG. 1, FIG. 3 is an elevational view of a light source as taken along Section 3—3 of FIG. 1, FIG. 4 is a schematic elevational view of another embodiment of an on-axis light source utilizing the concepts of the invention, FIG. 5 is a schematic elevational view of a further embodiment of an on-axis light source in accord with the invention, two light trap plates being utilized to improve light absorption, FIG. 6 is an elevational schematic view of another embodiment of an on-axis light source employing a pair of diffusers and light sources, FIG. 7 is an elevational schematic view of an on-axis light source in accord with the invention illustrating the lateral offset produced by a mirror beam splitter having a thin glass thickness, FIG. 8 is an elevational schematic view similar to FIG. 7 illustrating the lateral offset of the optical axis utilizing a beam splitter having a thicker dimension than that of FIG. 7, and FIG. 9 is an elevational schematic view of an on-axis light source in accord with the invention as using a correcting window to restore the lateral optical axis deformation produced by a glass mirror beam splitter.

DESCRIPTION OF THE PREFERRED EMBODIMENTS

In the drawings the components of the invention are illustrated in a generally schematic manner to best appreciate the general concepts of the invention.

The basic form of the invention is illustrated in FIG. 1 wherein a machine vision camera 10, such as a video camera, is positioned to image an object 12 located upon a support such as table 14. The camera includes an optical axis 16 as extending between the camera 10 and object 12, and in this description the phrase "on-axis" pertains to lighting of the object 12 in a substantially uniform and symmetrical manner about the axis 16.

The on-axis light source of the invention is particularly suitable for use with robotic controlled assembly or manufacturing apparatus, not shown. With such robotic apparatus, electronic signals from the camera 10 as resulting from the imaging of the object 12 are used to control the computer, not shown, which, in turn, controls the operation of the robotic apparatus. The object 12 may be supported on a movable table or movable jig constituting a part of the robotic apparatus wherein imaging of the object 12 permits the object to be very accurately located with respect to the axis 16 or the apparatus with which the object is to be associated. For instance, an on-axis light source such as described herein may be used with printed circuit assembly apparatus wherein electronic components are being assembled into a printed circuit board, or solder points are being provided in a printed circuit assembly process.

In order to provide the most accurate image of the object 12 it is important that the object 12 be illuminated in such a manner that a true and accurate representation of the object is sensed by the camera 10, and as many electronic components may include etched characters on a shiny and reflective surface the nature of the lighting of the object 12 becomes important with respect to the robotic functions being controlled by the camera.

In FIG. 1 the on-axis light source in accord with the invention is generally indicated at 18, and includes a housing represented by dotted lines 20. Within the housing 20 is located a beam splitter 22, a light transmitting diffuser 24, and a light trap 26 located on the opposite side of the beam splitter 22 with respect to the diffuser 24. Exteriorly of the housing 20 a lamp 28 is located for casting light upon the diffuser 24 as represented by arrows 30, and the light diffused by the diffuser 24 is represented by arrows 32. The beam splitter 22 includes a reflective bottom surface 36, and an upper or top surface 34 having an antireflection coating disposed toward the camera 10.

As will be appreciated from FIG. 1, the beam splitter 22 generally diagonally extends across the housing 20 and is penetrated by the optical axis 16. Of course, it will be appreciated that the housing 20 includes openings, not shown, in alignment with the camera 10 and the object 12, and for receiving the light from the lamp 28 as represented by arrows 30. The inner side walls of the housing 20 adjacent to the diffuser 24, beam splitter 22 and the light trap 26 are preferably of a diffusely light reflecting material to aid in the illumination of the object.

The beam splitter 22 is preferably in the form of a glass mirror having a thickness as defined by the surfaces 34 and 36. Mirror beam splitters are well known in the optic arts and a variety of reflective coatings are used with glass beam splitters. In the preferred embodiment a 50-50 beam splitter is preferred wherein half of the light received upon the silvered bottom surface 36 is reflected, while the other half of the light received by the beam splitter passes therethrough for absorption on the light trap 26. Preferably, magnesium chloride (MgCl) or other suitable compound is used as the antireflection coating on the top surface 34, and the antireflection coating on surface 34 permits the camera 10 to image the object 12 through the beam splitter 22 free of double or ghost images.

The diffuser 24 may consist of a planar plate of glass or plastic. The diffuser is of a wide-angle characteristic and may be formed as a rectangular plate as shown in FIG. 2 having a surface 38 which is translucent and capable of diffusing light passing through the diffuser. The diffuser 24 may be formed of an etched or ground glass, or may be formed of opal glass having light scattering centers of colloidal particles. Frosted glass, milky plastic or a Murata screen may also be used, Murata screen being formed of a diffusing synthetic plastic material. It is important that the diffuser 24 be of a wide-angle characteristic wherein light cast thereon is evenly diffused throughout the area of the diffuser so that a substantially uniform intensity of light passes through the diffuser for reflection on the object 12 from the beam splitter 22.

The lamp 28 may take a variety of forms, and in FIG. 1 is of a rectangular configuration having a plurality of bulbs 40 evenly spaced over the area of the lamp 28 as shown in FIG. 3. The lamp 28 may include a plurality of diodes, and the bulbs 40 could be diode elements, or the lamp may be incandescent fiber optic as described with respect to FIG. 4, or fluorescent. The particular requirement of the lamp 28 is that it be capable of supplying a uniform intensity of light upon the diffuser 24 so that the diffuser 24 may evenly diffuse such light as received from the lamp 28 and thereby provide a uniform illumination of the object 12.

Preferably, the beam splitter 22 is disposed at an angle of 45° with respect to the axis 16, however, it will be appreciated that the angle of the beam splitter may be somewhat varied from 45° and still function in the desired manner.

The light trap 22 consists of a planar panel defining a straight wall parallel to the plane of the diffuser 24, and parallel to the optical axis 16. The light trap panel 26 is preferably of a flat black color so as to be capable of maximum light absorption, and by locating the light trap in direct opposition to the diffuser 24, light passing through the beam splitter 22 from the diffuser 24 will be absorbed by the light trap 26 and not be reflected into the camera 10 so as to produce a stray erroneous signal.

With reference to FIG. 1, it will be appreciated that the illumination of the bulbs 40 produces an energizing of the lamp 28 permitting the diffuser 24 to be uniformly illuminated and the diffused light generated by the diffuser will be reflected from the beam splitter surface 36 in a uniform manner upon the object 12 as represented by the arrows 32. This uniform illumination of the object 12 in a symmetrical on-axis relationship to the axis 16 will permit the camera 10 to produce a highly accurate and uniform image of the object 12 and thereby produce the accurate robotic control of the positioning and manipulation of the object 12 desired.

A variation of an on-axis light source in accord with the inventive concepts is shown in FIG. 4 wherein components identical to those previously described are represented by identical reference numerals.

In FIG. 4 a mirror 42 oriented at 45° to the optical axis 16 is located adjacent the exterior surface of the diffuser 24. A fiberoptic light 44 is directed to impose light upon the collimating/focusing lens 46, and the light passing through the lens 46, as represented by arrows 48, will be reflected into the diffuser 24 which in turn casts diffused light upon the beam splitter 22 and the object 12 as described above with respect to FIG. 1.

It is envisioned within the inventive concepts that the light provided to the diffuser 24 may originate from a number of types of light sources, as discussed above.

FIG. 5 illustrates a variation in the light trap configurations, and in this embodiment components previously described with respect to FIG. 1 bear identical reference numerals.

In FIG. 5 a light trap panel 50 is disposed at a 45° angle to the horizontal, and the panel 50 will be of a light absorbing black color. Directly above the panel 50 a second light trap panel 52 is located which is of a horizontal orientation and is of a light absorbing black color. Thus, light passing through the beam splitter 22, as represented by arrow 54, will be primarily absorbed by the light trap 50, but any light reflected from the trap 50 will be absorbed by light trap 52. It is to be appreciated that the light trap panels 50 and 52 are out of alignment with the optical axis 16 such that the light traps do not interfere with the imaging of the object by the camera.

FIG. 6 illustrates another embodiment in accord with the concepts of the invention wherein additional diffused light may be imposed on the object. In FIG. 6 components identical to those previously described are illustrated by identical reference numerals as utilized in FIG. 1.

With reference to FIG. 6, the light trap panel 26 is located further from the object 12 than in the embodiment of FIG. 1, and an additional translucent diffuser 56 is located above the light trap 26. The diffuser 56 is constructed in the same manner as the diffuser 24. A lamp 58 provides a uniform intensity light to the diffuser 56 and the diffused light emitting from diffuser 56 will pass through the beam splitter 22 and illuminate the object 12 as represented by the arrows 60.

When using a mirror type beam splitter 22, a lateral offset of the optical axis 16 will occur due to the oblique orientation of the beam splitter to the optical axis 16, and the degree of lateral offset is directly related to the thickness and refractive index of the beam splitter glass mirror.

With reference to FIG. 7, components identical to those described with respect to FIG. 1 are indicated by identical reference numerals.

In FIG. 7 the imaged optical axis is represented at 62, and the arrows indicate the direction of light as reflected by the object being viewed by the camera. The linear extension of the axis 62 is represented at 64, however, because of the 45° orientation of the glass beam splitter 22 the light being reflected from the object is laterally displaced as represented by axis 66, and the optical offset difference between the axis 62 and the axis 66 is represented at 68. In FIG. 7 a thin glass mirror beam splitter 22 is illustrated having a lower silvered surface 70 and an upper non-reflective surface 72.

In FIG. 8 the components are identical to those shown in FIG. 7 except a thicker glass beam splitter 22 is illustrated as defined by lower surface 74 and upper surface 76 and the difference between the non-offset and offset axes is represented at 78, which will be appreciated as being greater than that as shown at 68.

The optical axis deviations discussed above with respect to FIGS. 7 and 8 can be corrected by using a correcting glass window as shown in FIG. 9 wherein components identical to those previously described are represented by identical reference numerals to those previously employed.

In FIG. 9 a beam splitter 22 identical to that shown in FIG. 8 is illustrated, and a glass correcting window 80 is located directly above the beam splitter 22. The window 80 is formed of the same glass type as the beam splitter 22, and is of the same thickness wherein the dimension between the beam splitter surfaces 74 and 76 will be equal to the dimension between the window lower surface 82 and the upper surface 84. Thus, as the light reflected from the object, although offset at axis 66, engages the window 80, it will be restored to the proper corrected optical axis 86 which is coaxial with axis 62, FIG. 9.

Of course, in order to achieve the described correction, in addition to the glass of the window 80 corresponding to that of the beam splitter 22, the angle of orientation of the window to the axis 62 must be identical to that of beam splitter 22, but in a reversed manner. Thus, the window 80 permits the optical axis 62 to be "bent back" so that axis 86 will represent the true location of the camera optical axis. If the correcting window 80 is formed of a transparent material having a different refractive index than that of the beam splitter the thickness of the correcting window may be different than that of the beam splitter, and the angle of orientation of the window may also differ. Of course, it is to be appreciated that the light transmitting characteristics of the window 80 be of such character as compared to the light transmitting characteristics of the beam splitter as to permit the light passing through the correcting window to be realigned with the correct optical axis.

The correcting window 80 is particularly useful where images using the on-axis light source of the invention must be geometrically related to images in the same installation and setup when the light source of the invention is removed, as may occur with certain uses of the robotic apparatus.

It is appreciated that various modifications to the inventive concepts may be apparent to those skilled in the art without departing from the spirit and scope of the invention.

We claim:

1. A light source for use with machine vision cameras having an optical axis extending to the object to be illuminated comprising, in combination, a light reflective beam splitter obliquely located within the optical axis having first and second sides, said first side being disposed toward the machine vision camera and said second side being disposed toward the object to be illuminated, a first light diffuser disposed toward said beam splitter second side, a light trap disposed toward said beam splitter first side in non-alignment with the optical axis and in opposed relation to said first diffuser absorbing light passing through said beam splitter from said second side to said first side, a first light source supplying light to said first diffuser whereby light from said first diffuser is cast upon said beam splitter second side and reflected upon the object to be illuminated, a second light diffuser disposed toward said beam splitter first side, and a second light source supplying light to said second diffuser whereby light from said second diffuser is cast upon said beam splitter first side and passes through said beam splitter to the object to be illuminated.

2. In a light source as in claim 1, said first and second diffusers each having a light diffusing area, said first and second light sources supplying a substantially uniform intensity of light over said light diffusing areas of said first and second diffusers, respectively.

3. In a light source as in claim 2, said first and second diffuser comprising translucent panels.

* * * * *